UNITED STATES PATENT OFFICE.

RICHARD HERBST, OF NEW YORK, N. Y.

COMPOSITION OF MATTER FOR MOLDS.

933,982.  Specification of Letters Patent.  Patented Sept. 14, 1909.

No Drawing.  Application filed September 1, 1908.  Serial No. 451,244.

*To all whom it may concern:*

Be it known that I, RICHARD HERBST, a citizen of the United States of America, residing in New York, in the borough of Queens and State of New York, have invented certain new and useful Improvements in Composition of Matter for Molds, of which the following is a specification.

This invention relates to composition of matter for molds, and more especially molds for casting artificial stone.

The compositions of matter heretofore used for molds were composed of a mixture of sand with an argillaceous or chemical binder and water. These molds were used for casting metals and other substances. The compositions were objectionable for the reason that they could be removed only with difficulty from the cast articles and could only be used over again with some difficulty.

The object of this invention is to produce a composition of matter for molds in which no binder for producing the adhesion of the particles is employed; and for this purpose the invention consists of a composition of matter for making molds which contains a mixture of crushed and finely ground silica rock and water, to which chalk may be added.

The silica rock as found in nature, is composed of about 99% pure silicic acid, a small percentage of alumina and traces of iron. The silica rock, preparatory to use, is subjected to a grinding, crushing or other comminuting action, being thereby converted into finely ground crystalline particles. These particles are mixed with water in a sufficient quantity to give the mixture the proper consistency for use as a mold. The adhesion of the individual particles is due to the irregular surfaces of the same, which impart a sufficient resistance to the mass when used as a mold. The mass is used in the same manner for forming the mold as when using ordinary molding sand. In some cases about 5% of pulverized chalk may be added to the mass.

As there is no binder employed, the chalk being added only, for the purpose of softening or "lubricating" the mass, the mass can be used over again after the articles have been cast by the simple breaking up of the mass into its pulverulent particles which is accomplished with very little loss of material. It can also be readily dusted out of the articles cast in the molds by an air-current, brush or otherwise. The composition can stand great heat as it contains no binder to burn out. It can not only be used for casting metal articles, but also on account of the fineness of the particles for casting artificial stone made from cement, which is produced with perfectly clear and sharp outlines.

Having thus described my invention, I claim as new and desire to secure by Letters Patent:

1. A composition of matter consisting of a mixture of finely ground crystalline silica particles, obtained from crushed silica rock, and water.

2. A composition of matter consisting of a mixture of finely ground crystalline silica particles, pulverized chalk and water.

In testimony whereof, I have signed my name to this specification in the presence of two subscribing witnesses.

Date May 8th 1908.

RICHARD HERBST.

Witnesses:
 EUGEN KADE,
 HARRY JASPER.